United States Patent [19]
Fujita et al.

[11] Patent Number: 6,068,093
[45] Date of Patent: May 30, 2000

[54] BAND BRAKE

[75] Inventors: Kazuyuki Fujita; Hideo Yanagihara, both of Shizuoka, Japan

[73] Assignee: NSK-Warner Kabushiki Kaisha, Tokyo, Japan

[21] Appl. No.: 08/988,136

[22] Filed: Dec. 10, 1997

[30] Foreign Application Priority Data

Dec. 11, 1996 [JP] Japan ..................................... 8-330914

[51] Int. Cl.⁷ .................................................. F16D 51/00
[52] U.S. Cl. ...................................... 188/77 W; 188/77 W
[58] Field of Search ................................ 188/77 W, 77 R

[56] References Cited

FOREIGN PATENT DOCUMENTS

| 406026535 | 2/1994 | Japan | 188/77 R |
| 406026536 | 2/1994 | Japan | 188/77 R |
| 2108014 | 5/1983 | United Kingdom | 188/77 W |

*Primary Examiner*—Robert J. Oberleitner
*Assistant Examiner*—Devon Kramer
*Attorney, Agent, or Firm*—Sughrue, Mion, Zinn, Macpeak & Seas, PLLC

[57] ABSTRACT

In a sectional view of the protrusion of an anchor bracket, the side surface, on the side of an anchor pin, of the protrusion has an engaging protrusion substantially trapezoid in section at the middle of the width thereof, and its top portion, namely, a flat portion is brought into line contact with the anchor pin. Hence, the band brake is advantageous in that the brake band is stable in position, the contact region is improved in wear resistance, and the operation is stable.

6 Claims, 3 Drawing Sheets

BAND BRAKE

BACKGROUND OF THE INVENTION

1. Field of the Invention

The present invention relates to a band brake used for an automatic transmission of a vehicle and the like.

2. Description of the Related Art

In an automatic transmission of an automobile and the like, a band brake, which is adapted to transmit a drive force or interrupt transmission of the drive force, is larger in static torque capacity than a multi-board clutch which is equal in size to the band brake. On the other hand, there has been a strong demand for miniaturization of an automatic transmission of an automobile and the like, and therefore the recent tendency is to increase the application of a band brake to an automatic transmission of an automobile and the like. In addition, there has been a strong demand for miniaturization of the band brake.

In the band brake, the brake band is abutted against the outer cylindrical surface of a drum to transmit the drive force or interrupt the transmission of same. In association with miniaturization of the automatic transmission, the band brake is also miniaturized. Hence, a method of abutting the brake band against the outer cylindrical surface of the drum is restricted.

FIG. 1 shows the general arrangement of a band brake of the type which is popularly employed. The band brake, indicated generally by reference number is formed by a transmission case 1, a drum 2 rotatably held in the case 1, a C-shaped brake band 3, and an anchor pin 4 and an apply pin 5 which are held in the case 1. The transmission case 1 has a space which accommodates the drum 2 and the brake band 3.

The brake band 3 includes a C-shaped metal band 35, a frictional lining 36 bonded to the inner cylindrical surface of the metal band 35; and an anchor bracket 31 and an apply bracket 32 which are secured to both ends of the band 35. The anchor bracket 31 has a protrusion 33 which is extended in the radial direction of the drum 2, and the apply bracket 32 has a protrusion 34 which is also extended in the radial direction of the drum 2.

The anchor pin 4 is a cylindrical member and is laid in parallel with the rotary axis of the drum (i.e., in the direction perpendicular to the surface of the drawing), and is in contact with the protrusion 33 of the anchor bracket 31.

The apply pin 5 is a cylindrical member a spherical end portion, which is slidably held by the transmission case 1 in a direction substantially tangential to the drum 2. The end portion of the apply pin 5 pushes and drives the apply bracket 32, to there by press the brake band 3 against the outer cylindrical surface of the drum 2 or to retract the brake band 3 to release the drum 2.

It is difficult to make the dimensions of all the components of the band brake correct. Thus, the dimension of the components and the contact of the anchor pin against the anchor bracket are unavoidably fluctuated. Accordingly, an excessively high load is locally applied thereto. In order to overcome this difficulty, a modified band brake has been proposed. That is, as is seen from FIG. 4 which is a side view of a part of the anchor bracket, FIG. 5 which is a plan view as viewed in the direction of the arrow S in FIG. 4, and FIG. 6 which is an enlarged diagram of a part of FIG. 5, in the band brake, the protrusion 33 has an engaging protrusion 31a on the anchor pin side in such a manner that the engaging protrusion 31a is in point contact with the cylindrical anchor pin 4. As shown in FIG. 6, on the side surface of the protrusion 33 (on the anchor pin side) of the protrusion, the engaging protrusion 31a, which is arcuate in section and has a radius indicated by the arrow R, is arranged at the middle of the anchor bracket as viewed in the direction of width thereof.

For example, the conventional band brake in which an anchor pin 4 shown in FIG. 1 is in point contact with a protrusion 33 of an anchor bracket 31 has an effect of dispersing a load uniformly. However, it is disadvantageous in that, because of the point contact, the contact region is greatly worn, which affects the drive stroke of the apply pin 5, which adversely affects the tightening response of the brake band. That is, the conventional band brake is low in operational stability. Furthermore, in the engaging region of the anchor pin 4 and the anchor bracket 31, there is nothing which directly regulates the brake band in the axial direction, so that the brake band is unstable in its position. Those difficulties are significant especially when the brake band is not tightened, and therefore, drag torque is increased, and the frictional lining is quickly worn out.

SUMMARY OF THE INVENTION

It is an object of the invention to provide a band brake in which the contact region of the protrusion of the anchor bracket with respect to the anchor pin is high in wear resistance, and which is stable in operation.

In a band brake according to the present invention, the protrusion of the anchor brake engaged with the anchor pin has an engaging protrusion which is a trapezoid in section, and the latter is brought in line contact with the anchor pin at the middle as viewed in the direction of the axis of the band brake.

PREFERRED EMBODIMENT OF THE INVENTION

A preferred embodiment of the present invention will be described as follows referring to the accompanying drawings.

Figure 1:
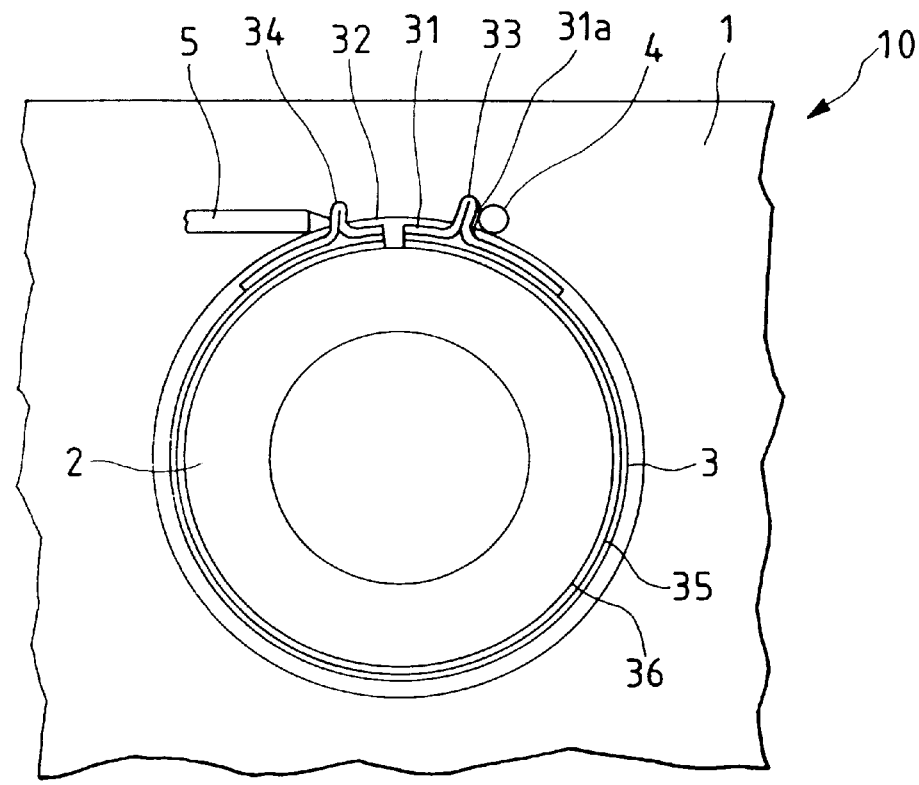
FIG. 1 is a diagram showing the fundamental structure of a band brake according to the invention.
Figure 2:
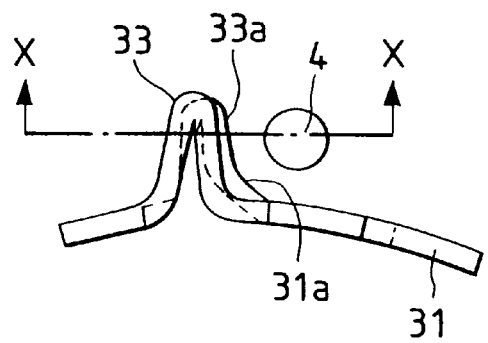
FIG. 2 is a side view of an anchor bracket in the band brake.
Figure 3:
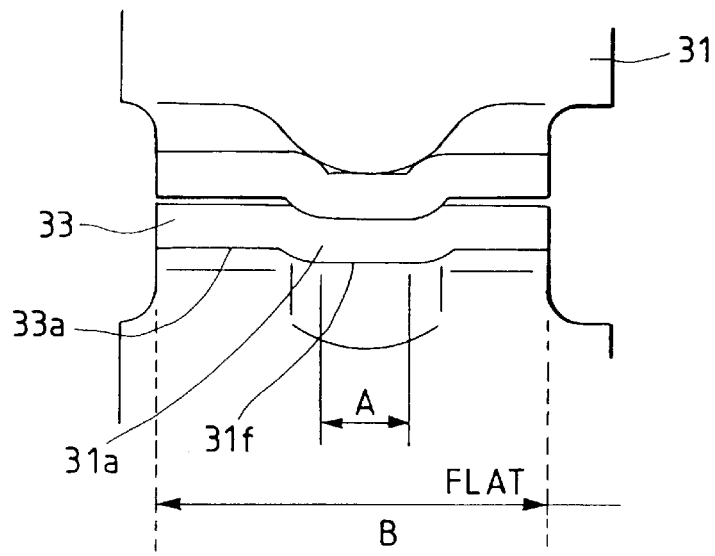
FIG. 3 is a sectional view taken along line X—X in FIG. 2.
Figure 4:
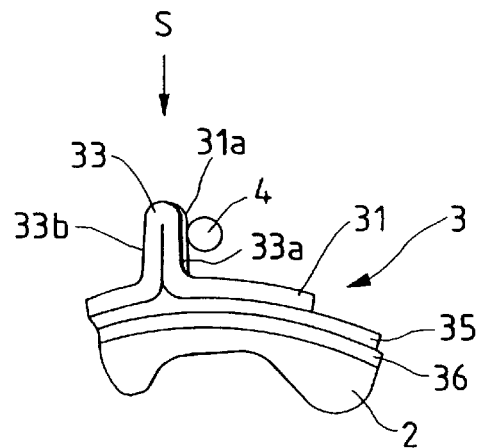
FIG. 4 is a side view showing a conventional anchor bracket.
Figure 5:
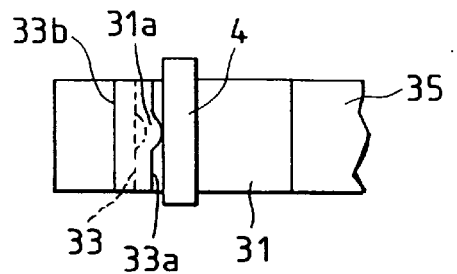
FIG. 5 is a plan view of the conventional anchor bracket as viewed in the direction of the arrow S in FIG. 4.
Figure 6:
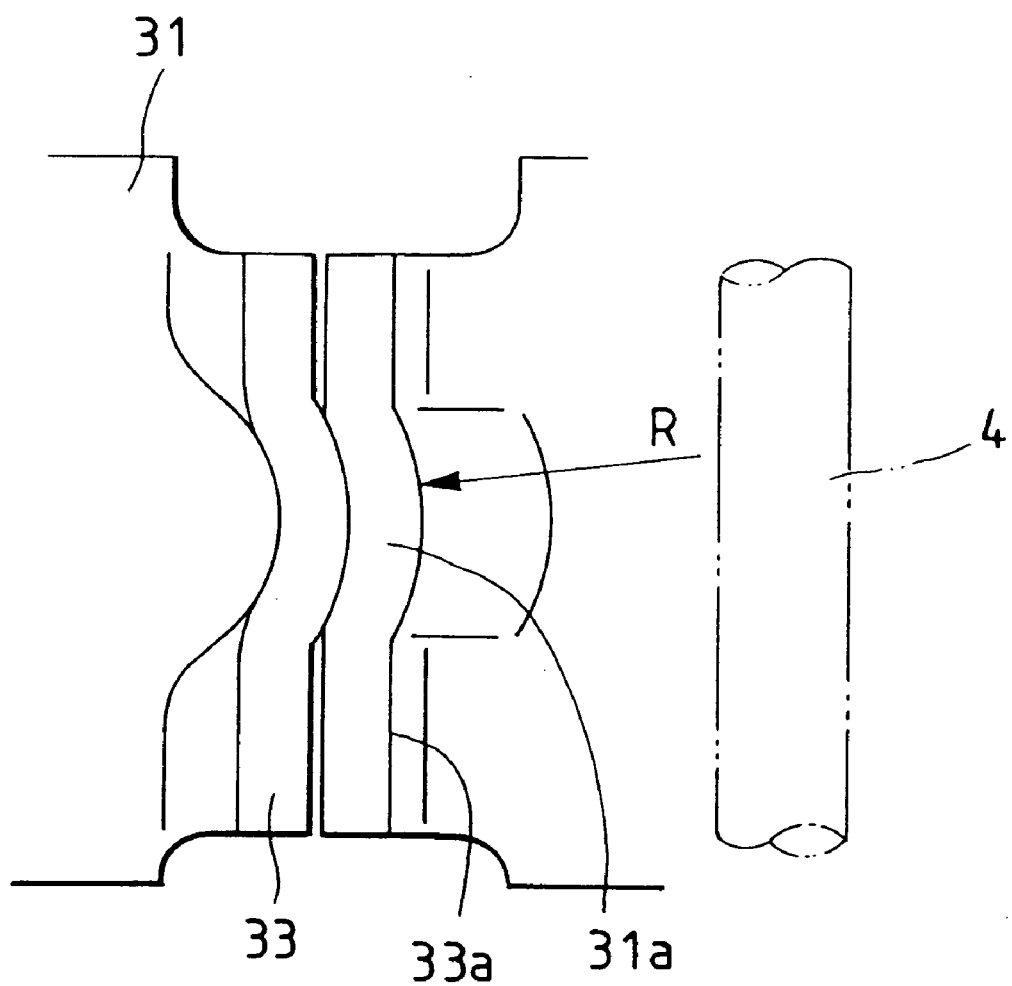
FIG. 6 is an enlarged plan view of a protrusion of the conventional anchor bracket.

A band brake according to the invention is equal in fundamental structure as shown in FIG. 1. FIG. 2 is a side view of anchor bracket 31 in the band brake of the invention. FIG. 3 is a sectional view taken along line X—X in FIG. 2 (as viewed in the same direction as in FIG. 6). The side surface 33a (on the anchor pin side) of the protrusion 33 of the anchor bracket 31 has an engaging protrusion 31a which is protruded circumferentially of the drum 2. The engaging protrusion 31a is arranged at the middle in the direction of width of the anchor bracket 31, and as is seen from FIG. 3 it is substantially trapezoid in section, and its top portion, namely, a flat portion 31f is in line contact with the anchor pin 4.

Further, as shown in FIG. 3, the width A of the flat portion 31f should be at least 10%, and preferably not less than 20%, of that of the width B of the protrusion 33. On the other hand, the width A can be equal to the width B. However, in order to maintain the strength of the anchor bracket 31, the width A is preferably not more than 80% of the width B. In FIG. 3, although the width B of the protrusion 33 is smaller than the width of the anchor bracket 31, they may be equal.

In the above-described band brake of the invention, the engaging protrusion is in line contact with the anchor pin. Hence, the wear resistance in the band brake of the invention is higher than that in the band brake in which the engaging protrusion is in point contact with the anchor pin. In addition, even if the brake band is somewhat shifted in a direction of width, or the anchor pin is inclined with respect to the protrusion of the anchor bracket, the trapezoidal top portion regulates the axial position of the brake band, so that the band brake of the invention is stabilized in function.

The band brake of the invention is designed as described above, and the anchor pin is in line contact with the protrusion of the anchor bracket. Therefore, the band brake is high both in mechanical strength, and in wear resistance, and stable in function.

What is claimed is:

1. A band brake comprising:

a case;

a drum which is rotatably held in said case;

a brake band which is detachably abutted against the outer cylindrical surface of said drum, and has a first locking section and a second locking section at both ends thereof, said first and second locking sections being protruded radially of said drum;

an anchor pin which is held in said case, and is engaged with said first locking section; and an apply pin which is held in said case, and drives said second locking section to drive said brake band to cause said brake band to abut against said drum;

wherein said anchor pin is cylindrical and is extended in parallel with the axis of rotation of said drum;

said first locking section engaged with said anchor pin has an engaging protrusion trapezoid in section at the middle as viewed in the direction of width thereof which is protruded circumferentially of said drum and has a flat portion extending radially of said drum; and said first locking section is brought into line contact with said anchor pin through the flat portion of said engaging protrusion.

2. A band brake as recited in claim 1, wherein said first locking section comprises an anchor bracket (31) having a protrusion (33), and said engaging protrusion is formed on a side surface of said protrusion (33).

3. A band brake as recited in claim 2, wherein a width of the flat portion of said engaging protrusion is 10% to 80% of a width of said protrusion (33).

4. A band brake as recited in claim 2, wherein a width of the flat portion of said engaging protrusion is 20% or more of a width of said protrusion (33).

5. A band brake as recited in claim 2, wherein a width of the flat portion of said engaging protrusion is 20% to 80% of a width of said protrusion (33).

6. A band brake as recited in claim 2, wherein a width of said protrusion (33) is equal or less than a width of said anchor bracket (31).

* * * * *